(12) United States Patent
Lachaud et al.

(10) Patent No.: US 7,191,227 B2
(45) Date of Patent: Mar. 13, 2007

(54) SYSTEM FOR DYNAMICALLY CHANGING THE COMMUNICATION MEANS USED FOR COMMUNICATION BETWEEN TWO SOFTWARE AGENTS

(75) Inventors: Philippe Lachaud, Palaiseau (FR); Véronique Daurensan, Antony (FR)

(73) Assignee: Alcatel, Paris (FR)

( * ) Notice: Subject to any disclaimer, the term of this patent is extended or adjusted under 35 U.S.C. 154(b) by 717 days.

(21) Appl. No.: 09/740,823

(22) Filed: Dec. 21, 2000

(65) Prior Publication Data

US 2001/0052005 A1 Dec. 13, 2001

(30) Foreign Application Priority Data

Dec. 30, 1999 (FR) .................................. 99 16722

(51) Int. Cl.
*G06F 15/177* (2006.01)

(52) U.S. Cl. ............... 709/221; 709/220; 709/222; 709/223; 709/340; 709/317; 709/331; 719/311; 719/312; 719/313; 719/314; 719/317; 714/1; 714/2; 714/43; 714/100

(58) Field of Classification Search ........ 709/220–223, 709/317, 331, 240
See application file for complete search history.

(56) References Cited

U.S. PATENT DOCUMENTS

| | | | | |
|---|---|---|---|---|
| 5,948,069 A * | 9/1999 | Kitai et al. | ................. | 709/240 |
| 6,009,464 A | 12/1999 | Hamilton et al. | | |
| 6,069,947 A * | 5/2000 | Evans et al. | ................. | 379/229 |
| 6,205,122 B1 * | 3/2001 | Sharon et al. | ............... | 370/254 |
| 6,292,657 B1 * | 9/2001 | Laursen et al. | ............. | 455/411 |
| 6,560,235 B1 * | 5/2003 | Jones | .......................... | 370/401 |
| 6,687,222 B1 * | 2/2004 | Albert et al. | ................ | 370/230 |
| 6,691,117 B2 * | 2/2004 | Ellison et al. | ................ | 707/10 |
| 6,714,952 B2 * | 3/2004 | Dunham et al. | ............ | 707/204 |
| 6,715,100 B1 * | 3/2004 | Hwang | ........................ | 714/5 |
| 6,718,137 B1 * | 4/2004 | Chin | ............................. | 398/3 |
| 6,772,190 B2 * | 8/2004 | Hodjat et al. | ............... | 709/202 |
| 6,927,869 B1 * | 8/2005 | Simpson et al. | ........... | 358/1.15 |
| 2001/0041556 A1 * | 11/2001 | Laursen et al. | ............. | 455/406 |
| 2003/0105802 A1 * | 6/2003 | Kurashima et al. | ......... | 709/203 |

OTHER PUBLICATIONS

Microsoft, Computer Dictionary, Microsoft Press, fifth edition, p. 474.*
I. Foster et al, Managing Multiple Communication Methods in High-Performance Networked Computing Systems, Journal of Parallel and Distributed Computing, US, Academic Press, Duluth, MN, vol. 40, No. 1, Jan. 10, 1997, pp. 35-48, XP000682836.
"Dynamic Application Communications Interface Management, Dynamic Communication Protocol/Transport management and Dynamic Communication Profile Management", IBM Technical Disclosure Bulletin, US, IBM Corp. NY, vol. 34, No. 7A, Dec. 1, 1991, pp. 42-45 XP000255455.
"Implementation of a Client Supporting in Communication Systems", IBM Technical Disclosure Bulletin, US, IBM Corp., New York, vol. 40, No. 8, Aug. 1, 1997, pp. 115-116, XP000735602.

* cited by examiner

*Primary Examiner*—Fritz Fleming
*Assistant Examiner*—Niketa I. Patel
(74) *Attorney, Agent, or Firm*—Sughrue Mion, PLLC

(57) ABSTRACT

A system and a method for changing the communication means used for communication between two software agents. Each software agent has a communication module, which gives the software agents access to the communication means. In addition, the software agents have means for receiving a new communication module from the communication server.

18 Claims, 1 Drawing Sheet

FIG_1
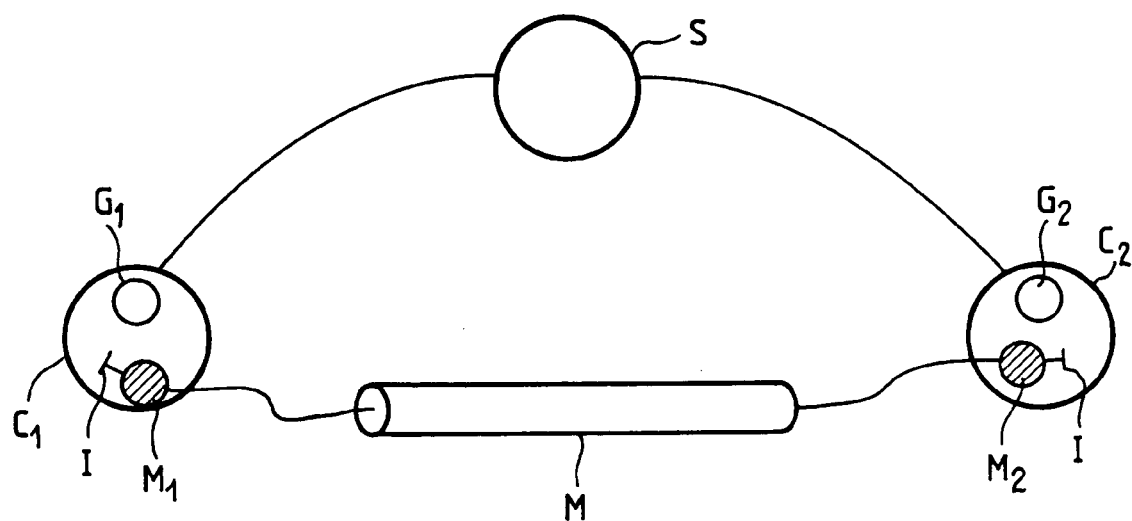
FIG_2a
FIG_2b
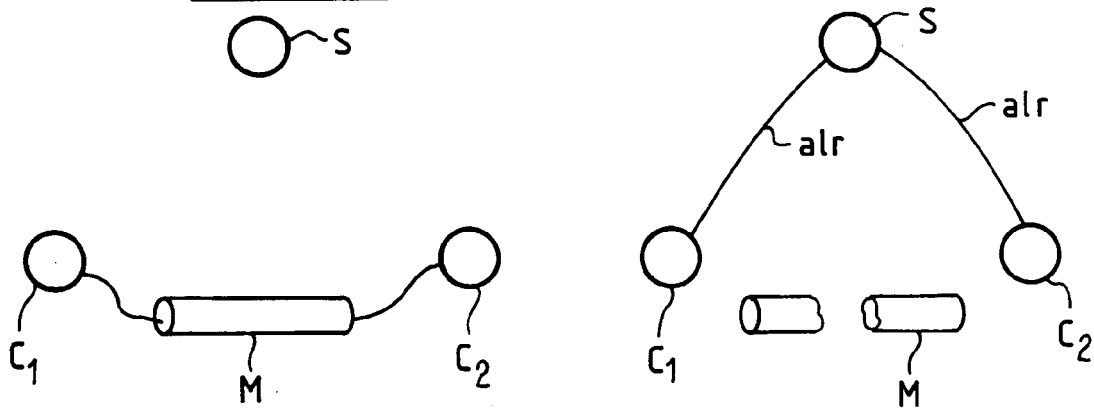
FIG_2c
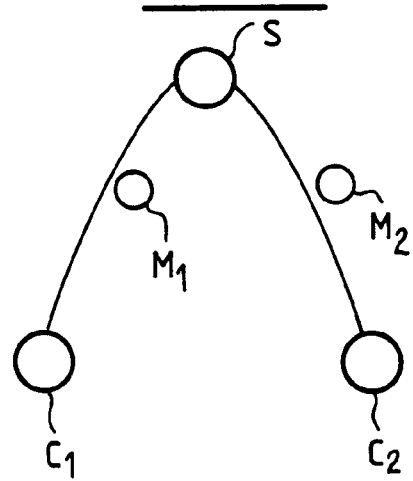
FIG_2d
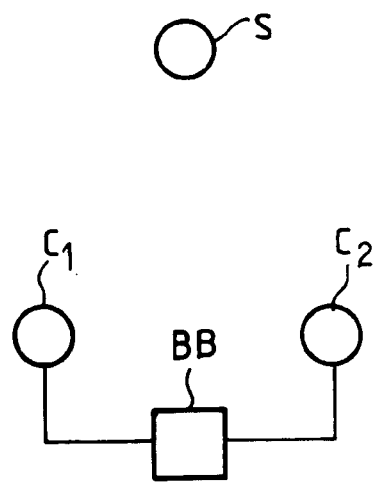

SYSTEM FOR DYNAMICALLY CHANGING THE COMMUNICATION MEANS USED FOR COMMUNICATION BETWEEN TWO SOFTWARE AGENTS

The present invention relates to a system enabling the communication means used between two software agents within a distributed architecture to be changed in dynamic manner. The invention applies particularly well to distributed agent architectures.

BACKGROUND OF THE INVENTION

The term "agent" or "software agent" is used to designate any piece of object code that is to some extent autonomous and independent. Because of this independence, communication between a plurality of agents can give rise to problems.

In present-day distributed software architectures, software agents communicate with one another over preestablished communication means. These channels can be of various kinds.

They can be point-to-point communication means or broadcast communication means or indeed other types of communication means can be used.

With point-to-point means, data sent by a first software agent is received only by a single second software agent via dedicated communication means.

With broadcast communication, the data sent by the first software agent can be received by one or more software agents.

The communication means can be an asynchronous communication channel such as a notification channel. By way of example, this type of communication means is very commonly used in the context of common object request broker architecture (CORBA) as defined by the open management group (OMG).

Another way of providing communication means is of the "blackboard" type: a software agent writes data for communication into a dedicated memory zone which is read periodically by the destination software agent(s).

Naturally, these examples of communication means do not constitute an exhaustive list of all methods of communication that can be used between two software agents.

Nevertheless, it is important to observe that in the state of the art, the particular communication means used are always determined when the software system is designed. In other words, no system is provided for enabling the communication means to be modified during the lifetime of the system.

Unfortunately, there exists a need to be able to modify the communication means between a plurality of software agents of a system in dynamic manner (i.e. during the lifetime of the system).

This need can stem from a preceding communication means being unavailable. Such unavailability can be the result, for example, of a connection breaking down in the computer network in which the sender and destination software agents are implemented.

The need can also arise from the necessity of maintaining the system. For example, in order to correct a problem in the system, it can be important to find out what information is being conveyed over a communication means. Under such circumstances, it is necessary to modify the communication means so as to make it readable by an operator, or by some third software application.

Another need can arise from a desire to share loading. If some particular communication means is momentarily or permanently saturated with traffic, then it can be beneficial to change it so as to increase the performance of the system.

OBJECTS AND SUMMARY OF THE INVENTION

An object of the present invention is thus to satisfy these needs by proposing a system for dynamically modifying the communication means used between two software agents for transmitting data.

To do this, the invention provides firstly for the system to comprise a communication server, and secondly for the software agents to include:

a communication module giving access to said communication means; and means for receiving a new communication module from said communication server.

The invention also provides a method enabling the above-defined precautionary server and software agents to be used. The method comprises the following steps:

said software agents sending messages to a communication server informing it of said breakdown;

said server sending communication modules to said software agents, said communication modules being designed to give access to a different communication means; and said software agents using said communication modules to continue communicating.

Thus, in the present invention, it is not only possible to change dynamically the communication means used, but also it is possible to change it to the extent of changing its nature. Thus, communication which previously used a notification channel can dynamically opt for "blackboard" type communication.

BRIEF DESCRIPTION OF THE DRAWING

The invention and its advantages appear more clearly from the following description given with reference to the accompanying figures.

FIG. 1 shows an implementation of the invention.

FIG. 2 shows various steps in a scenario implementing the mechanisms of the invention.

MORE DETAILED DESCRIPTION

In FIG. 1, two software agents $C_1$ and $C_2$ communicate via communication means M. By way of example, these software agents can be agents proper, i.e. independent software entities, having their own execution resource or "threads" available to them.

The communication means is a notification channel, for example. In order to use this communication channel, the software agents make use of communication modules $M_1$ and $M_2$.

The software agents have no need to be aware of the nature of the communication means, nor do they need to be aware of how it is accessed, in other words which particular application programming interface (API) it presents.

According to a characteristic of the invention, all of the communication modules have the same programming interface I for presentation to software agents. Thus, software agents can access communication means in a single manner using this single programming interface without being concerned about the programming interface of the communication means itself.

In other words, the role of the communication modules is to translate between the software agents via a first programming interface which is common, and the communication means used via a second programming interface which is specific thereto.

This common first interface can, for example, include functions of the type "send message" and "receive message". The function of the communication module is to implement those functions and to format the data for transmission as a function of the kind of communication means used.

The software agents $C_1$ and $C_2$ also have means $G_1$ and $G_2$ for receiving new communication modules from a communication server S.

The communication server can be common for the entire system, or a plurality of communication servers can exist having means for exchanging information between one another.

The communication modules transmitted by the communication server(s) can replace the previous communication modules ($M_1$ and $M_2$). As mentioned above, they preferably possess a programming interface that is identical to that of the preceding modules, but giving access, for example, to some other communication means (not shown).

As also mentioned above, this other communication means can be of the same kind as the preceding communication means, i.e. in this case a notification channel. Under such circumstances, the reason why it might be necessary change notification means could be saturation of the first notification channel, or that it has been interrupted due to an accident to the system, or indeed because it is desired to use a channel that provides a different quality of service.

It is also possible for the communication means to be of a different kind, e.g. of the "blackboard" type.

To make transmission possible, the communication modules (which are software elements) are preferably encoded in a language such as Java that enables their object code to be caused to migrate through a distributed computer system. Under such circumstances, it is possible for the software agents to load communication modules dynamically by using this particular mechanism of the Java language.

It is also possible to provide for the object code corresponding to the various communication modules that can potentially be used to be stored locally. The communication server then only transmits references designating a particular communication module from the set of available modules.

FIGS. 2a, 2b, 2c, and 2d show the case in which the notification means is changed at the initiative of the software agent following a breakdown of this first communication means.

In FIG. 2a, the software agents $C_1$ and $C_2$ are communicating over a notification channel M.

For some reason, the notification channel is interrupted and is no longer capable of transmitting information between these two software agents.

In FIG. 2b, the software agents have become aware of the breakdown in the notification channel (e.g. by failure to receive an acknowledgment from said notification channel after sending data). On becoming aware of the interruption, the software agents send alarm messages (messages alr) to the communication server S informing it of the breakdown of the communication means between the two software agents $C_1$ and $C_2$.

In response to these two messages, the communication server S sends two communication modules $M_1$ and $M_2$ to the two software agents $C_1$ and $C_2$.

These two communication modules are designed to use a blackboard (BB) type communication means. They are then integrated in the software agent, e.g. by being loaded dynamically as mentioned above.

In FIG. 2d, the two software agents can again communicate, at this time via a new communication means (of the "blackboard" type) by using the two communication modules $M_1$ and $M_2$ that they received from the communication server S.

In an implementation of the invention, the communication server can on its own initiative send communication modules to the software agents, thereby changing the communication means they use for communicating.

By way of example, the communication server may cause such a change to take place in application of a predetermined relationship. For example, it can change the communication means once every five messages on the empirical assumption that that will minimize overloading of the various communication means in the system.

Changeover can also be caused by the communication server in response to a warning due to some particular communication means becoming overloaded.

In the first case it is a question of taking preventative action so as to avoid an overload occurring, whereas in the second case the idea is to minimize the consequences of such overloading.

The invention claimed is:

1. A system implemented on at least one computer for changing a communication means used for communication between two software agents, the system comprising:
   a communication server, and
   each of said software agents comprises:
   a communication module giving access to said communication means; and
   means for receiving a new communication module from said communication server,
   wherein each of said software agents comprises at least a piece of an object code of a distributed computing,
   wherein said software agents use the communication means to communicate with each other, and
   wherein, when a software agent from said software agents receives the new communication module, the software agent communicates using the new communication module via a new communication means with another software agent from said software agents, thereby changing the communication means between the two software agents.

2. A system according to claim 1, in which said software agents further comprise means for sending a request to said communication server to cause said new communication module to be transmitted.

3. A system according to claim 1, in which said communication server comprises means for receiving requests for loading communication means from a man machine interface, causing said new communication module to be transmitted.

4. A system according to claim 1, in which said communication server further comprises means for responding to internal rules to decide that said new communication module should be transmitted.

5. A system according to claim 1, in which said communication module is loaded dynamically by said software agents.

6. A system according to claim 1, in which said software agents and said communication modules communicate via a common programming interface.

7. The system according to claim 1, wherein each of said software agents use said new communication module to access new communication means to communicate with each other.

8. The system according to claim 1, wherein each of said software agents further comprises means for switching from the communication module to the new communication module, and wherein the new communication module provides access to a different communication means, and wherein each of said software agents communicate with each other via the different communication means.

9. The system according to claim 1, wherein said software agents comprises a first software agent located on a first computer and a second software agent located on a second remote computer, wherein the server is located on a computer remote from said first and second software agents, and wherein each of said first and second software agents comprise said at least a piece of an object code of the distributed computing that is at least partially independent.

10. The method according to claim 1, wherein the software agents comprise said at least a piece of an object code of the distributed computing that is at least partially independent.

11. The system according to claim 1, wherein, when the software agents inform the communication server of a breakdown in the communication means used for communication between the two software agents, the communication server sends the new communication module for the changing of the communication means between the two software agents.

12. A method, implemented by at least one computer, of correcting a breakdown in a communication means used between two software agents, the method comprising:
    said software agents sending messages to a communication server informing the server of said breakdown;
    said server sending communication modules to said software agents, said communication modules being designed to give access to a different communication means; and
    said software agents using said communication modules to continue communicating with each other,
    wherein each of said software agents comprises at least a piece of an object code of a distributed computing.

13. The method according to claim 12, wherein said different communication means is a different type of communication means.

14. The method according to claim 13, wherein said different type of communication means is a broadcast type of communication means.

15. The method according to claim 13, wherein said different type of communication means is a point to point type of communication means.

16. The method according to claim 12, wherein said software agents are software program objects in a distributed computing, each of said agents further comprises a common programming interface, and wherein said communication module translates between the common interface and another programming interface specific to said different communication means.

17. The method according to claim 12, wherein the software agents communicate directly with each other and are at a location remote from the communication server, and wherein the server is contacted to obtain the new communication module for direct communication between the software agents.

18. The method according to claim 12, wherein:
    the software agents send the message to the communication server informing the server of the breakdown in the communication means used between the two software agents,
    wherein, in response to the message from the software agents, the communication server sends the communication modules to said software agents, and
    wherein said software agents obtain access to the different communication means using the received communication modules.

* * * * *